United States Patent [19]

Ishikawa

[11] Patent Number: 4,929,968

[45] Date of Patent: May 29, 1990

[54] PRINTING HEAD ASSEMBLY

[75] Inventor: Takatoshi Ishikawa, Furukawa, Japan

[73] Assignee: Alps Electric Co., Ltd., Tokyo, Japan

[21] Appl. No.: 399,657

[22] Filed: Aug. 28, 1989

[30] Foreign Application Priority Data

Aug. 29, 1988 [JP] Japan .......................... 63-112956[U]

[51] Int. Cl.[5] .......................... G01D 15/16; B41J 3/04

[52] U.S. Cl. .......................... 346/140 R

[58] Field of Search .......................... 346/140

[56] References Cited

U.S. PATENT DOCUMENTS 4,403,228 9/1983 Miura .......................... 346/75

4,504,844 3/1985 Ebi .......................... 346/140

4,595,937 6/1986 Conta .......................... 346/140

OTHER PUBLICATIONS

Ross R. Allen et al., "Thermodynamics and Hydrodynamics of Thermal Ink Jets", May 1985, Hewlett-Packard Journal, pp. 21-26.

*Primary Examiner*—Joseph W. Hartary

*Attorney, Agent, or Firm*—Guy W. Shoup; Gideon Gimlan

[57] ABSTRACT

An ink-jet printing head assembly having a substrate and a cover plate which are juxtaposed with a space provided therebetween, for a nozzle at one edge of said substrate, an air chamber behind said nozzle, and an ink chamber with an outlet into the air chamber beyond the air chamber. A first electrode is located along an edge of the inner surface of the substrate and on one side of the nozzle. A second electrode is located on the inner surface of said substrate in the outlet opening between the ink chamber and the air chamber and separated from the first electrode by a space. The printing head ink used is conductive. The surface tension of the ink prevents it from flowing out of the small outlet from the ink chamber into to the air chamber when air is flowing into said air chamber and out of the nozzle. When a voltage is applied across two electrodes the electric field between the electrodes creates an attractive force the overcomes the surface tension of the ink in the outlet and ink flows into the air chamber where droplets are formed and the air transports the to an object to be printed. A printing head assembly according to the invention having electrodes and nozzles with a high concentration per unit area can be realized by means of a film formation technique. Such a compact and light-weight designed printing head assembly with a high concentration of nozzles can be manufactured using mass production techniques.

4 Claims, 2 Drawing Sheets

PRINTING HEAD ASSEMBLY

BACKGROUND OF THE INVENTION

1. Field of the Invention

This invention relates to a printing head assembly for use with an ink-jet type printing machine.

2. Relevant Art

An ink jet type printing head assembly using vapor pressure to assist in the application of ink is disclosed for example by Allen et al., "Thermodynamics and Hydrodynamics of Thermal Ink Jets", Hewlett-Packard Journal, May 1985, pp. 21–26.

FIG. 3 illustrates a prior art ink jet type of printing head assembly which uses air pressure to assist in the application of ink. In FIG. 3, reference numeral 1 denotes a front panel and reference numeral 2 denotes a rear panel of the assembly. A number of front nozzles 4, each having an inner diameter of approximately 50μ m, are formed on the front panel 1, while a corresponding number of rear nozzles 5 are formed on the rear panel 2 in an aligned relationship. One common electrode 6 is provided on the front surface of the front panel so that it covers the front nozzles 4, while a plurality of separate electrodes 7 are provided on the rear surface of the rear panel 2 so that they each cover a respective one of the rear nozzles 5. An ink chamber 8 is provided behind the rear panel 2. A spacing between the rear panel 2 and the front panel 1 defines an air chamber 9. The ink chamber 8 receives ink from an ink reservoir 10, and the latter reservoir 10 is pressurized by an air pump 11. The air pump 11 also pressurizes the air chamber 9.

The printing head assembly described above functions in the following manner.

When a voltage is applied between one or more of the separate electrodes 7 and the common electrode 6, an electro-static type of attractive force is generated to pull an ink droplet out from each activated rear nozzle 5 into the air chamber 9. As a result of air supplied by the air pump 11 to the air chamber 9, air jet streams are formed in the air chamber 9 and these blow out of front nozzles 4. The ink droplets which have been pulled out of the ink chamber 8 into air chamber 9 by the electrostatic attractive force spout out from the front nozzles 4 in the form of many tiny droplets and these tint a paper surface (not shown) placed near the front nozzles 4.

PROBLEMS TO BE SOLVED BY THE INVENTION

In the prior art printing head described above, it is difficult to align the front nozzles 4 with the rear nozzles 5 accurately and precisely when forming a high density print head having small and/or closely spaced nozzles. This is a drawback that hinders miniaturization and weight reduction of the printing head.

OBJECT OF THE INVENTION

It is therefore an object of the invention to provide a structure and method by which a small and lightweight printing head assembly having a high density of nozzles may be easily manufactured.

SUMMARY OF THE INVENTION

According to the invention, there is provided a printing head assembly comprising a monolithic substrate having an electrode edge and a back edge disposed opposite to the electrode edge. A cover plate is placed above the substrate with a space provided therebetween to define an air chamber. A first electrode is provided along the electrode edge of the substrate in facing relation with the cover plate. A plurality of second electrodes is provided on the surface of the substrate also in facing relation to the cover plate but separated from the first electrode. A number of nozzle walls are provided between the substrate and the cover plate, along the electrode edge of the substrate, to define nozzles. A number of partitions are provided between the substrate and the cover plate, with the center of each partition being aligned directly with the center of a corresponding nozzle wall along an axis line extending perpendicularly from the electrode edge of the substrate. The partitions are separated from the nozzle walls by a space. Ink jet outlets are formed between the partitions. An ink chamber is formed within the space between the substrate and the cover plate. A boundary of the ink chamber may be defined by a line projected along the edge of the partitions closest to the nozzle wall. The ink chamber may extend to the substrate. The air chamber formed between the substrate and the cover plate is interposed between the wall of partitions that define the ink chamber and the wall of nozzles defined by the plural nozzle walls.

While the above description of a printing head assembly according to the invention refers to a plurality of nozzles, such a printing head may comprise a single front nozzle and a single rear nozzle. If a printing head assembly according to the invention comprises only a front nozzle and a rear nozzle, nozzle walls may be realized by a circumferential wall of the print head.

Separation of the ink chamber and the air chamber of a printing head assembly according to the invention can be realized by various means. Examples of feasible separation methods include items 1 through 3 below.

1. Provide a partition between the ink chamber and the air chamber to separate them from each other. This method requires holes on the partition to allow ink to flow from the ink chamber into the air chamber. Alternatively, a number of separate partitions may be used so that many slits are formed therebetween and ink flows therethrough. A low profile partition may be formed so that a slit is formed between either the substrate or the cover plate and the partition.

2. Provide a substrate and a cover plate both or one of which have an inner surface that is easily wetted by ink in the area of the ink chamber but is hardly wetted by ink in the area of the air chamber.

3. Provide a substrate and a cover plate which are so arranged that the space between them is sufficiently small in the area of the ink chamber so that ink can move in the ink chamber area only by capillary action and so that the space between the cover and the substrate is relatively large in the area of the air chamber such that the ink is not restricted to capillary movement in that area.

EFFECTS OF THE INVENTION

A printing head assembly in accordance with the invention is used in a condition where the ink chamber is substantially filled with ink and the air chamber is substantially filled with air. Air supplied to the air chamber forms jet streams that spout out from the nozzles. If voltage is applied to the first and the second electrodes under this condition, the ink contained in the ink chamber is attracted toward the first electrode by the electrostatic attractive force generated by the voltage. The attracted ink is then blown out of the nozzle in the form of minute ink droplets.

The printing head assembly may be advantageously realized by forming sequentially the first electrode, the second electrodes and then the nozzle walls on a top surface of the substrate and then setting the cover plate on top of the substrate.

Now the invention will be described in greater detail by referring to the accompanying drawings that illustrate a preferred embodiment of the invention.

DETAILED DESCRIPTION OF THE INVENTION

Figure 1:
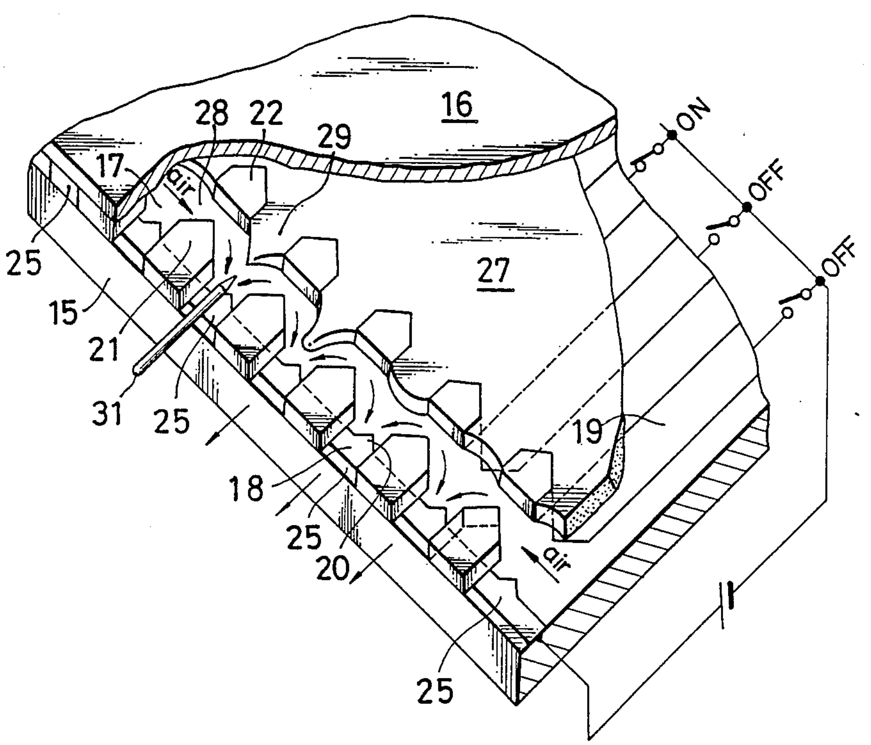
FIG. 1 is a partially cut-out perspective view of an embodiment of the printing head assembly according to the invention.
Figure 2:
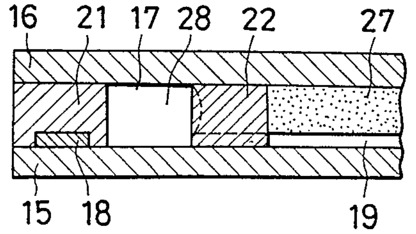
FIG. 2 is a sectional view of the embodiment of FIG. 1 taken along line 2—2.
Figure 3:
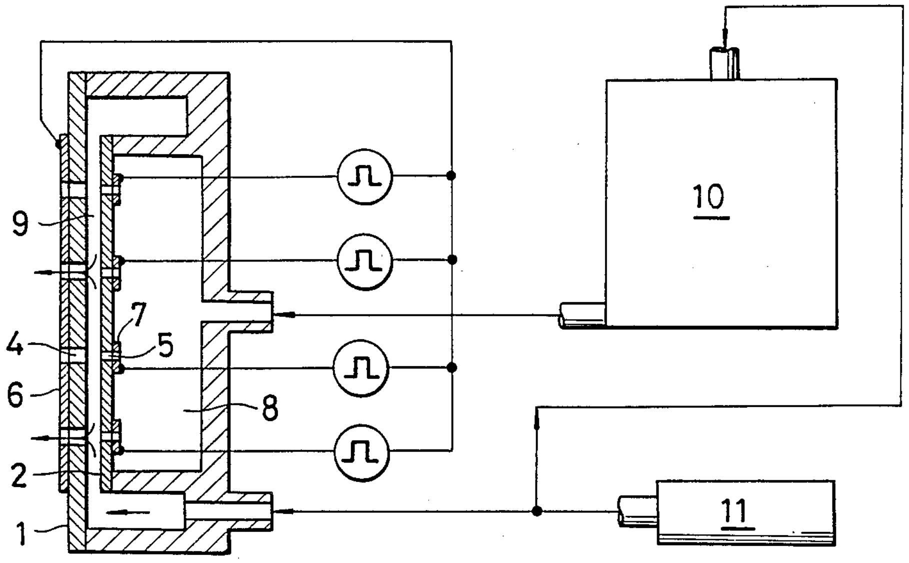
FIG. 3 (PRIOR ART)
FIG. 3 is a schematic sectional view of a printing head assembly of the prior art.

In FIGS. 1 and 2 illustrating a preferred embodiment of the printing head assembly according to the invention, reference numeral 15 denotes a monolithic substrate and reference numeral 16 denotes a cover plate. The substrate 15 and the cover plate 16 are of substantially planar structure and they juxtaposed with a space 17 of approximately 50 μm provided between them. The substrate 15 and the cover plate 16 are preferably made of an insulative material such as glass.

Along and near a front edge of the top surface of the substrate 15, there is provided an electrically conductive, common electrode 18 preferably made of an electrically conductive material such as aluminum. The common electrode 18 is spaced slightly away from a distance of approximately 50 μm and in parallel with the front edge of the substrate. The common electrode 18 has a number of triangular bulges 20 which project away from the front edge of the substrate 15 at locations where the centers of nozzles 25, which are described later, are to be formed.

A plurality of separate electrodes 19 preferably made of an electrically conductive material such as aluminum are also formed on the top surface of the substrate 15. These separate electrodes 19 are arranged in a row which is parallel to and separated from the common electrode 18 by a distance of approximately 50 μm and located farther from the front edge of the substrate than the common electrode 18. Each of the separate electrodes 19 has a triangular bulge at its end closest to the common electrode 18. The separate electrodes 19 are arranged in a row with a predetermined space (pitch) being provided between adjacent separate electrodes.

On the top surface of the substrate 15 on which said common electrode 18 and said separate electrodes 19 are arranged, a plurality of nozzle walls 21 preferably made of an electrically insulative material such as acrylic polymer is also provided. These nozzle walls 21 are so arranged that a space 17 created between the front edge of the substrate 15 and the cover plate 16 is blocked by the plurality of nozzle walls 21 to thereby form a plurality of nozzles 25 located between the substrate 15 and the cover plate 16 at the front edge of the assembly, said nozzles 25 being located opposite to the separate electrodes 19. A side of each of the nozzle walls 21 is aligned with an edge of the substrate-cover plate assembly. The opposite side of each nozzle wall 21 has a triangular bulge projecting away from the edge of the substrate-cover plate assembly.

The space 17 between the substrate 15 and the cover plate 16 is divided to form an ink chamber 27 occupying the area between said separate electrodes 19 and the edge of the assembly opposite to the one along which the common electrode 18 is formed and an air chamber 28 defined by said chamber 17 and said nozzle walls 21. Ink is supplied to the ink chamber 27 from an ink reservoir, while air is supplied to the air chamber 28 by an air pump, neither of which is shown in FIGS. 1 or 2.

The ink chamber 27 and the air chamber 28 are separated by partitions 22 preferably made of an electrically insulative material such as acrylic polymer, which are located between said separate electrodes 19 or at the back of the nozzle walls 21 and approximately 150 μm away from the back edge of the nozzle walls. The side of each of the partitions 22 facing the common electrode 18 is flat, while the opposite side of the partitions 22 has a triangular bulge. Said partitions 22 are so arranged that the flat face of each of them is aligned with an imaginary line connecting the tips of the bulges of each of the separate electrodes 19. Gaps between two adjacent partition walls form ink outlets 29. The size of the ink outlets 29 is so determined that the outlets 29 do not allow ink to flow therethrough because of the surface tension of ink forms a meniscus across the outlet when no voltage is applied to the electrodes 18 and 19, but lets ink gush out therethrough once voltage is applied across electrodes 18 and 19 as the static attractive force generated by the voltage on the ink surpasses the surface tension of the ink.

A printing head assembly as described above functions in the following manner.

The ink chamber 27 is supplied with ink while the air chamber 28 is supplied with air. The ink in the ink chamber 27 is prevented from flowing into the air chamber through the ink outlets 29 by the surface tension of ink creating a meniscus across the outlet opening. The air supplied into the air chamber 28 forms a number of jet streams of air as it passes through the nozzles 25 as indicated by the arrows in FIG. 1.

When voltage is applied across a separate electrode 19 and the common electrode 18 under this condition, the static attractive force on the ink generated by the voltage causes the ink in the chamber 27 to spout out into the air chamber through the outlets 29.

Then the spouting ink is blown away in fine drops 31 from the nozzles 25 with the air streams.

A printing head assembly as described above is prepared in the following manner.

Firstly, a common electrode 18 and separate electrodes 19 are formed on the inner surface of a substrate 15. These electrodes may be formed by means of a thin film formation technique such as CVD, vacuum deposition or sputtering, a thick film formation technique such as nonelectrolytic plating or screen printing or any of the known techniques for formation of electrically conductive films.

Then nozzle walls 21 and partitions 22 are formed on the substrate 15 on which the common electrode 18 and the separate electrodes 19 have been formed. These nozzle walls 21 and partitions 22 may be formed with ease by utilizing the existing printing techniques using photosensitive dry films. To form nozzle walls 21 and partitions 22 from photosensitive dry films, an appropriate number of photosensitive dry films are bonded to the substrate 15 and thereafter the dry films are exposed to light by using photomasks and then developed to form the walls 21 and the partitions 22. It may be needless to say that the height of the nozzle walls 21 and the partitions 22 corresponds to the thickness of the photosensitive layer of the films.

After forming the nozzle walls 21 and the partitions 22, a cover plate is mounted to complete preparation of a printing head assembly.

Since a printing head assembly as described above contains a common electrode 18, separate electrodes 19 and nozzle walls 21 that form nozzles on a same plane, the electrodes 18 and 19 as well as the nozzle walls 21 can be realized with a high concentration per unit area.

Moreover, the partitions 22 which are arranged on the top surface of the substrate 15 may also be formed by means of a film formation technique at the same time with said nozzle walls 21.

Thus, a printing head assembly according to the invention can be realized with a high concentration of nozzles 25 which are accurately aligned with their corresponding ink outlet 29 so that compact and lightweight printing head assemblies can be manufactured, using mass production techniques. Since a printing head assembly according to the invention can be produced with a very compact design, allowing reduction of the volume of the air chamber, the air pump can be operated at a high efficiency.

Since the common electrode 18 and the separate electrodes 29 of the printing head assembly are formed on a same plane as described above, they can be placed very close to one another so that the printing head assembly can generate fine ink droplets 31 with a relatively small amount of energy.

A printing head assembly according to the invention is particularly advantageous in that it can generate fine ink droplets 31 without requiring a large amount of energy since the common electrode 18 is provided on the inner surface of the substrate in close vicinity to the separate electrodes 19 and the bulged section 20 of the common electrode 18 and the tip of each of the separate electrodes 19 have a triangular configuration so that electric fields are produced with a high degree of concentration. An experiment conducted by the inventor of the present invention showed that a printing head assembly of prior art requires 400 V to generate fine ink drops, whereas only 100 V is required for a printing head assembly according to the present invention to produce the same result.

Since the rear side of each of the nozzle walls 21 of a printing head assembly of the invention is triangularly bulged so that each of the nozzles 21 reduces its sectional area nearer to the front end, the air streams running from the air chamber 28 through the nozzles 25 increase their speed as they approach the front ends of the nozzles 25. Consequently, fine ink drops blown out of the nozzles can fly away with a very high velocity.

EFFECTS OF THE INVENTION

A printing head assembly according to the invention comprises a substrate and a cover plate which are juxtaposed with a space provided therebetween, a first electrode being provided along an edge of the inner surface of said substrate, a number of second electrodes being provided farther from the edge than the first electrodes and separated from the first electrode by a space, a number of nozzle walls being provided between said substrate and cover plate along an edge of said substrate, said nozzle walls forming so many nozzles therebetween, an ink chamber being further formed within the space between said substrate and said cover plate and defined by the front lines of said second electrodes and other edges of the assembly and an air chamber being formed and defined between said ink chamber and said nozzle walls. A printing head assembly according to the invention, having electrodes and nozzles with a high concentration per unit area can be realized by means of a film formation technique. Such a printing head assembly with a high concentration of nozzles can be manufactured with a compact and lightweight design on mass production basis. As the volume of the air chamber of a printing head assembly is reduced along with the reduction of the overall dimensions of the assembly, so the efficiency of the air pump involved will be enhanced.

Since the first and second electrodes of a printing head assembly according to the invention are placed on a same plane, said first and second electrodes may be located very close to one another. Consequently, such a printing head assembly can generate fine ink drops with a relatively small amount of energy.

What is claimed is:

1. A printing head assembly comprising:

a substrate having a first edge and a second edge disposed across said substrate opposite from said first edge;

a cover plate placed opposite to said substrate with a space provided therebetween, wherein the surfaces of the substrate and the cover plate facing the space are known as inner surfaces;

a first electrode provided along said first edge of the inner surface of said substrate;

a second electrode provided on an inner surface of said substrate farther from said edge of said substrate than the first electrode and separated from the first electrode by a space;

at least two nozzle walls provided between said substrate and cover plate along said first edge of said substrate, said nozzle walls forming at least one nozzle therebetween;

an ink chamber formed within the space between said substrate and said cover plate and defined by (1) a line approximately parallel to said first edge of said substrate located at an edge of said second electrode closest to said first edge, (2) said second edge of said electrode, and (3) predetermined side boundaries;

an air chamber formed within the space between said substrate and said cover plate and defined by the space between said ink chamber and said nozzle walls; and at least two partitions provided between said substrate and cover plate located immediately adjacent to and on the ink chamber side of said line approximately parallel to said first edge of said substrate located at an edge of said second electrode closest to said first edge of said substrate forming an outlet for ink from said ink chamber above said second electrode between said partitions and directly opposed to said nozzle, the opening of said outlet being sized so that the surface tension of ink in the ink chamber forms a meniscus in the outlet opening and thereby prevents ink from flowing out therefrom; and a conductive ink such that when a voltage is applied across said first and second electrodes an electrical field is formed between said electrodes creating a force attracting said conductive ink and causing said conductive ink to flow into said air chamber from said ink chamber, whereby air flowing in said chamber out said nozzle carries said conductive ink to deposit in on an object.

2. A printing head assembly as in claim 1 wherein said first electrode has a bulge at the center of said nozzle extending toward said second electrode to reduce the distance between said first and said second electrode at that point thereby providing a concentrated electric field at that location as a result of the reduced gap between electrodes when a voltage is applied.

3. A printing head assembly as in claim 1 wherein said second electrode has a bulge at the center of said outlet extending toward said first electrode to reduce the distance between said first and said second electrode at that point thereby providing a concentrated electric field at that location as a result of the reduced gap between electrodes when a voltage is applied.

4. An ink jet printer comprising:

an insulative substrate having a top surface;

an electrically conductive first electrode provided on the top surface;

a plurality of spaced apart second electrodes provided on the top surface, each of the second electrodes being spaced apart from the first electrode so as to define an electrical field gap between the respective second electrode and the first electrode;

ink chamber defining means for containing a body of ink in an ink chamber area of the top surface;

nozzle defining means for defining one or more ink jet nozzles in a nozzle area of the top surface; and air chamber defining means for defining an air chamber area of the top surface interposed between the nozzle area and the ink chamber area.

* * * * *

UNITED STATES PATENT AND TRADEMARK OFFICE

CERTIFICATE OF CORRECTION

PATENT NO. : 4,929,968

DATED : May 29, 1990

INVENTOR(S) : Takatoshi Ishikawa

It is certified that error appears in the above-identified patent and that said Letters Patent is hereby corrected as shown below:

Title page:

Abstract:

line 14, delete "to"

line 18, delete "the" first occurrance and insert --that-- line 20, delete "the"

Signed and Sealed this

Twenty-fifth Day of June, 1991

Attest:

HARRY F. MANBECK, JR.

Attesting Officer

Commissioner of Patents and Trademarks